US008758140B2

(12) United States Patent
Hall et al.

(10) Patent No.: US 8,758,140 B2
(45) Date of Patent: Jun. 24, 2014

(54) METHOD FOR VIRAL INVITES AS GAME AND DISCOVERY MECHANIC

(75) Inventors: Gary Hall, Redmond, WA (US); Debra Thiel, Redmond, WA (US); Travis Howland, Fall City, WA (US); Linh Van, Woodinville, WA (US); Bryan Trussel, Redmond, WA (US); Joshua Howard, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1553 days.

(21) Appl. No.: 12/054,364

(22) Filed: Mar. 24, 2008

(65) Prior Publication Data
US 2009/0239666 A1 Sep. 24, 2009

(51) Int. Cl.
*A63F 13/00* (2014.01)
*A63F 13/12* (2006.01)

(52) U.S. Cl.
CPC ...................... *A63F 13/12* (2013.01)
USPC .......................................................... 463/42

(58) Field of Classification Search
CPC .............. A63F 13/12; A63F 2300/556; A63F 2300/572; A63F 2300/5546; A63F 2300/5566
USPC ................................................ 463/1, 29, 42
See application file for complete search history.

(56) References Cited

U.S. PATENT DOCUMENTS

| 6,241,612 | B1 | 6/2001 | Heredia |
| 6,554,707 | B1 | 4/2003 | Sinclair et al. |
| 6,579,184 | B1 | 6/2003 | Tanskanen |
| 6,692,359 | B1 | 2/2004 | Williams et al. |
| 6,699,125 | B2 * | 3/2004 | Kirmse et al. ............... 463/42 |
| 6,880,168 | B2 | 4/2005 | Maehiro |
| 7,240,093 | B1 | 7/2007 | Danieli et al. |
| 7,628,704 | B1 * | 12/2009 | Uhlir et al. ................... 463/42 |
| 7,953,644 | B2 * | 5/2011 | Tracey ........................ 705/26.1 |
| 2005/0037846 | A1 | 2/2005 | Anokhin |
| 2007/0155506 | A1 | 7/2007 | Malik |
| 2007/0173325 | A1 | 7/2007 | Shaw et al. |
| 2007/0218997 | A1 | 9/2007 | Cho |

OTHER PUBLICATIONS

Markus Montola, Integrated Project on Pervasive Gaming, WorkPackage WP5: Design & Evaluation Deliverable D5.3B: Domain of Pervasive Gaming, public release Jan. 31, 2006, 31 pages www.pervasive-gaming.org/downloadables/D5.3B.doc.
Messaging with Xbox 360, Microsoft Corporation http://www.xbox.com/en-US/support/systemuse/xbox360/livefeatures/messaging.htm.

* cited by examiner

*Primary Examiner* — David L Lewis
*Assistant Examiner* — Robert Mosser
(74) *Attorney, Agent, or Firm* — Micah Goldsmith; Leonard Smith; Micky Minhas

(57) ABSTRACT

A method and system are disclosed for methods of providing a gaming experience including an in-game viral invite mechanic. In accordance with the present system, inviting others to join in the playing of a game is an objective of the game itself. Thus, a user is encouraged by the game to invite his or her friends, who are in turn encouraged to invite their friends, etc., so that a game may cascade pyramid-fashion to a potentially huge viral fan-out.

16 Claims, 5 Drawing Sheets

METHOD FOR VIRAL INVITES AS GAME AND DISCOVERY MECHANIC

BACKGROUND

Gaming systems have evolved from those which provided an isolated gaming experience to networked systems providing a rich, interactive experience which may be shared in real time between friends and other gamers. With Microsoft's Xbox® video game system and Xbox Live® online game service, users can now easily communicate with each other while playing to share the gaming experience. Moreover, when not playing in tandem, current gaming systems allow friends to track others' gaming experiences and accomplishments.

A key challenge across game platforms today is discovery. That is, the way existing gamers find a game or activity, and the best way for them to tell their friends and others about it. This so-called "viral" phenomenon is a much-sought-after trait for game sites, community sites such as You Tube™, Windows Live™ Spaces, etc., and other social environments (even non-digital). The propagation of games and other media through viral marketing is often more effective than a corporate advertising campaign, and has none of the costs associated with a corporate advertising campaign.

One current method for telling friends about a game a user is playing is through existing communications platforms such as email and chat. Using such messaging systems, users can communicate their gaming experiences to friends, as well as invite their friends to download/purchase and play the game so that the friends can share the same gaming experience. Another option for sharing gaming experiences is where a user simply starts playing a game and a friend spots them online and joins the game.

These types of viral marketing of a game may be referred to as "out-of-game" viral mechanisms, in that a game may spread to friends and friends of friends, etc., but the spread of the game is ancillary to the game itself. That is, there is nothing in the game itself which requires or encourages the viral invite of others as part of the game play. A friend invites another friend to play, or friends find each other online, purely so that the friends can share a common gaming experience. The sharing of the gaming experience between friends in conventional gaming systems does not affect the game itself.

SUMMARY

Embodiments of the present system relate to methods of providing a gaming experience including an in-game viral invite mechanic. In accordance with the present system, inviting others to join in the playing of a game is an objective of the game itself. Thus, a user is encouraged by the game to invite his or her friends, who are in turn encouraged to invite their friends, etc., so that a game may cascade pyramid-fashion to a potentially huge viral fan-out. A game session according to the present system may be synchronous, where a user invites his or her friends to join and play the user's game session in real time until completion. A game session may alternatively be asynchronous, where the game continues while some or even all players are off-line at a given time.

In addition to the actual invitation to join, an invite may include a variety of other data. For example, the invite may include a GUID or other identifier uniquely designating the particular game session, as well as a game state identifier uniquely placing the invite within the hierarchy of game invites. A game invite may further include a variety of rich descriptor data regarding the inviting player as well as other upstream inviting players within the chain of invitations. This information may include, for each user in the chain, the on-line identity of the user, geographic location of the user, the age of the user, the gender of the user, as well as a wide variety of other information.

In embodiments, the information regarding invited players, as well as a status of sub-games between invited players, may be stored on a central database accessible to the players via a peer-to-peer network and/or via a client/server network. In order to store the data received from each player in a particular game session in a coherent, easily manageable and scaleable fashion, the central database may be partitioned in a hierarchical manner to include a separate game storage location for each sub-game in a particular game session. In addition to making the game easily scalable to a large number of players, the database allows game states to be persisted. That is, regardless of whether game play is synchronous or asynchronous, the game state for a given game may be maintained in storage, and available to players whether they remain online in real time, or have returned after being logged off for a period.

DETAILED DESCRIPTION

Embodiments of the present system will now be described with reference to FIGS. 1-6, which in general relate to a gaming platform including an in-game mechanic where viral invites affect the game itself. In embodiments, it is an object of the game itself to invite one or more additional players. Invited players in turn have the same object to invite one or more players, thus encouraging viral spread and discoverability of the game and on-line gaming experience. In embodiments, it may be an object of a game to invite others in order to affect the outcome of the game, i.e., winning the game or obtaining some other specified goal of the game. In further embodiments, it may be an object of a game to invite others simply as a game mechanic that adds value to the game play experience. That is, the game invite object may be a mechanic that adds to the enjoyment of the game instead of, or in addition to, affecting an outcome, goal or other aspect of the game.

As explained hereinafter in greater detail, a game may spread linearly from user to user, or a game may cascade geometrically, in a pyramid fashion to a huge fan-out of users. This would drive discoverability of the underlying gaming platform to a level believed to be unknown in conventional gaming systems, and present a completely new game mechanic for game authors to build creative experiences around. While embodiments of the present system are described hereinafter with respect to a gaming system, it is understood that the present system may be expanded to social environments including community sites such as YouTube™, Windows Live™ Spaces and other environments which may or may not be digital.

It is contemplated that the present system may be massively scaleable over either a peer-to-peer network and/or a client/server network which may encompass potentially the entire globe. The gaming experience including the viral invite mechanic may be either synchronous or asynchronous. In particular, some games may be short-lived, where all players remain online for the duration of the game and invites are sent and received in real time. Alternatively, a gaming experience may be asynchronous, where the game continues while some or even all players are off-line at a given time. In an asynchronous gaming session, an invited friend may be off-line at the time an invitation is sent, and/or the inviting user may be off-line when an invitation is accepted. In both the synchronous and asynchronous experiences, game data is persistent. That is, game data relating to game session identification, the number of players, information about each of the players and other data is maintained on a database while the game is being played as explained in greater detail below.

Figure 1:
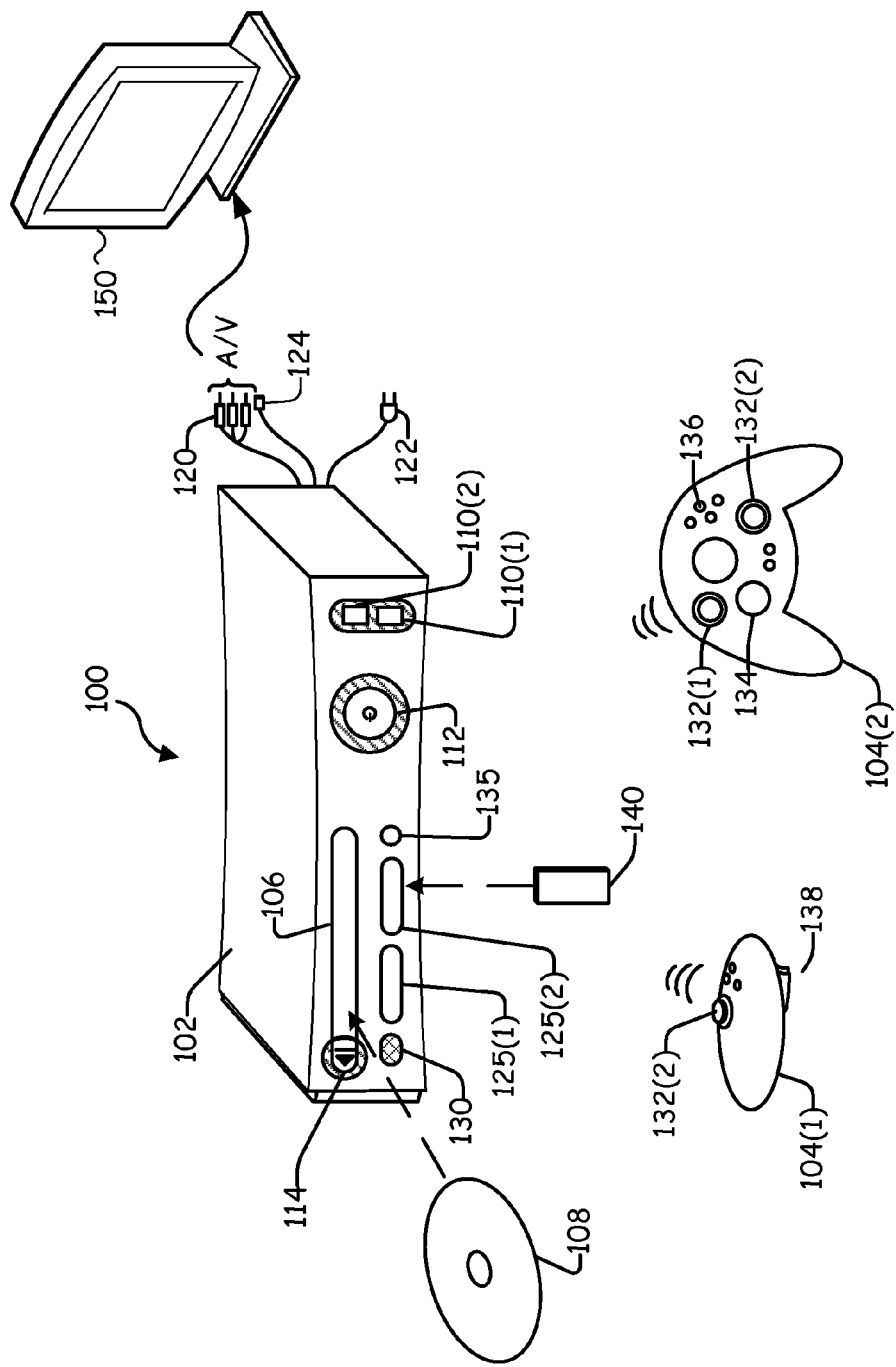
FIG. 1 is an isometric view of an exemplary gaming and media system.

FIG. 1 shows an exemplary gaming and media system 100 on which a gaming experience according to the present system may be carried out. The following discussion of FIG. 1 is intended to provide a brief, general description of a suitable environment in which concepts presented herein may be implemented. Other computing environments are possible. Moreover, it is understood that the present system may be implemented on a variety of different computing environments instead of one particular environment. For example, the present system may be implemented in games included as part of an instant messaging client, such as for example MSN® Messenger. In further embodiments, the present system may be implemented in web-based games, for example as part of MSN® Internet services. In both of these examples, a user may invite others to join in his/her gaming experience. As such, games according to the present system may be provided where it is an object of the game to invite friends, who in turn invite friends, etc. so as to be virally scaleable to large numbers of players. Still other gaming platforms are contemplated where a user may invite his or her friends to join a game, either from a friends list or otherwise.

Referring now to FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller 104 is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140. Samples of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to select a game using controller 104 and display achievement information as discussed below.

Figure 2:
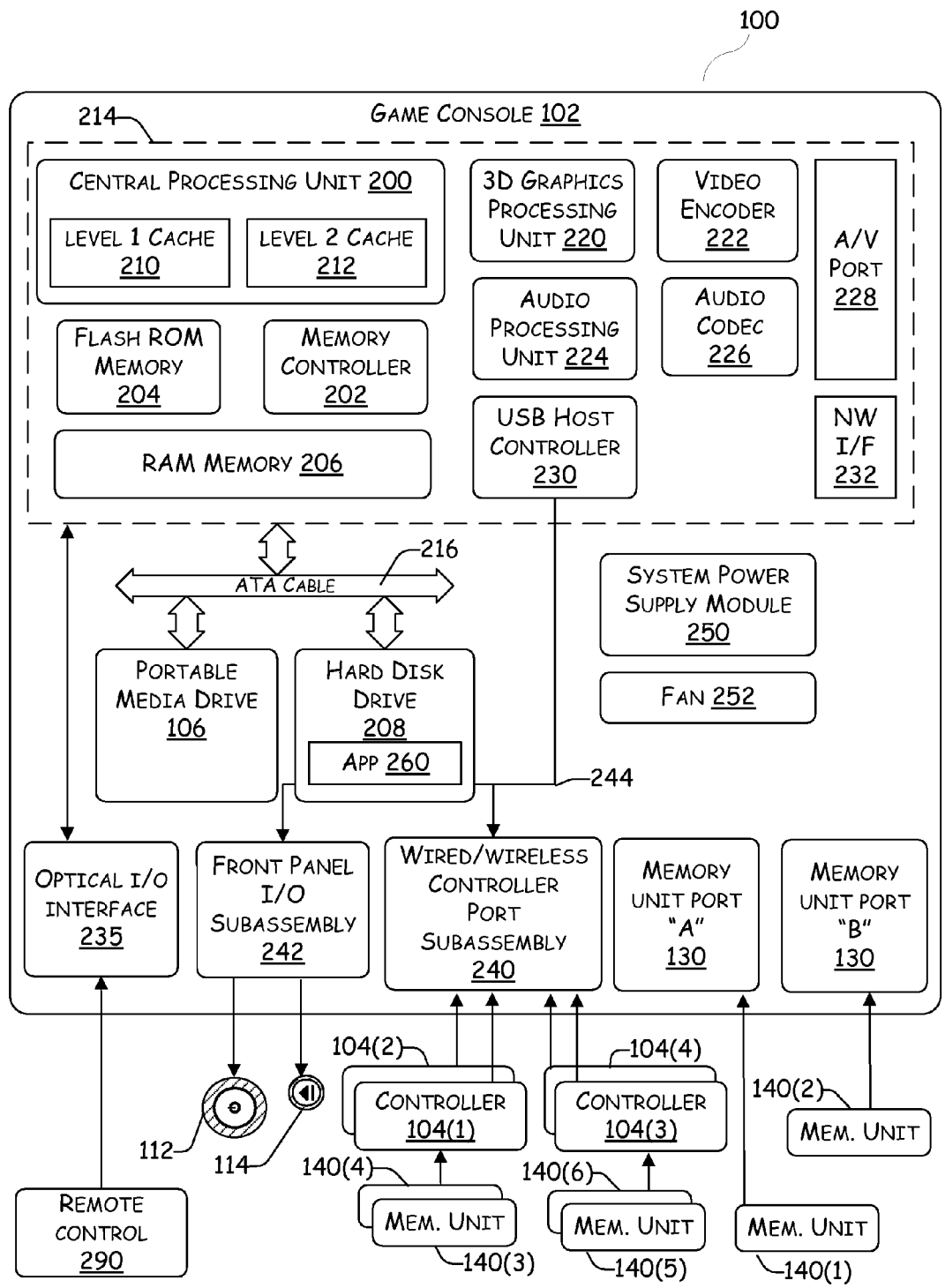
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wired or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200. When initiated, application 260 loads game instructions into CPU 200 that configure the CPU 200 to process game control data and render the game display.

Gaming and media system 100 may be operated as a standalone system by simply connecting the system to monitor 150 (FIG. 1), a television, a video projector, or other display device. Gaming and media system 100 can operate as a standalone unit, for example enabling one or more players to play games, or enjoy digital media, e.g., by watching movies, or listening to music. However, in accordance with the present system, with the integration of broadband connectivity made available through network interface 232, gaming and media system 100 may be operated as a participant in a larger network gaming community, as discussed below in connection with FIG. 3.

Figure 3:
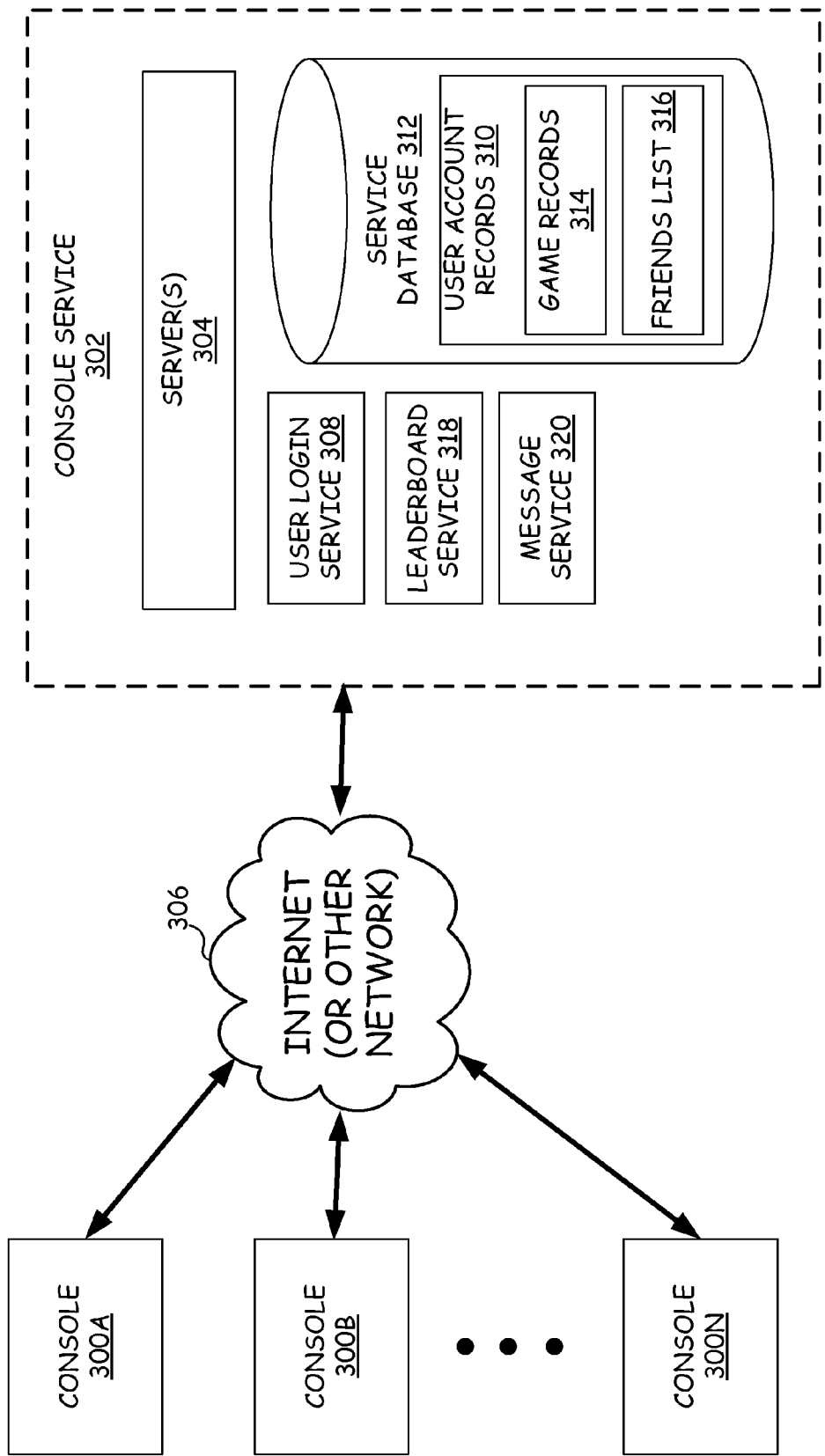
FIG. 3 is a block diagram of an exemplary operating environment for rendering achievement information.

FIG. 3 provides a block diagram of multiple consoles 300A-300N networked with a console service 302 having one or more central servers 304 through a network 306. In one embodiment, network 306 comprises the Internet, though other networks such as LAN or WAN are contemplated. As explained below, network 306 may be a peer-to-peer network or client/server network, or a combination of the two. Server (s) 304 include a communication component capable of receiving information from and transmitting information to consoles 300A-N and provide a collection of services that applications running on consoles 300A-N may invoke and utilize.

For example, consoles 300A-N may invoke user login service 308, which is used to authenticate a user on consoles 300A-N. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a central database 312, which may be located on the same server as user login service 308 or may be distributed on a different server or a collection of different servers. Once authenticated, user login service 308 stores the console identifier and the network path in user records 310 so that messages and information may be sent to the console.

User records 310 store identification and descriptive information about the user such as for example the user's on-line identity, where a user lives, age, gender, etc. This information may be used to form traversal maps and other rich data which is passed around during a viral invite game of the present system as explained hereinafter. User records 310 can also include additional information about the user such as game records 314 and friends list 316. Game records 314 include information for a user identified by a gamer tag and can include statistics for a particular game, achievements acquired for a particular game and/or other game specific information as desired. As discussed in greater detail below, game records 314 may be broken out into a partitioned database to keep track of the game state of a large number of sub-games for a given session of a game which may be generated with the in-game viral invite mechanic of the present system.

Friends list 316 includes an indication of friends of a user that are also connected to or otherwise have user account records with console service 302. The term "friend" as used herein can broadly refer to a relationship between a user and another gamer, where the user has requested that the other gamer consent to be added to the user's friends list, and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case.

Friends list 316 can be used to create a sense of community of users of console service 302, as well as form the basis for the viral invites according to the present system as explained below. Users can select other users to be added to their friends list 316 and view information about their friends such as game performance, current online status, friends list, etc.

User records 310 also include additional information about the user including games that have been downloaded by the user and licensing packages that have been issued for those downloaded games, including the permissions associated with each licensing package. Portions of user records 310 can be stored on an individual console, in database 312 or on both. If an individual console retains game records 314 and/or friends list 316, this information can be provided to console service 302 through network 306. Additionally, the console has the ability to display information associated with game records 314 and/or friends list 316 without having a connection to console service 302.

Server(s) 304 also include message service 320 which permits one console, such as console 300A, to send a message to another console, such as console 300B. Such messages can include text messages, voice messages, and specialized invite text messages. Invite text messages allow a user playing the game on one console to invite one or more users on another console to play in the same game while using network 306 to pass gaming data between the two consoles so that the two users are playing from the same session of the game. Friends list 316 can also be used in conjunction with message service 320.

There are at least two ways in which a game may fan-out to a large number of players via the in-game viral invite mechanic of the present system. The first way is a geometric fan-out, where a player may invite a number of friends, who each in turn invite a number of friends, who in turn invite a number of friends, etc. A geometric fan-out of a game has the ability to get very large very quickly.

In an embodiment of the geometric model, all players together will be participating in a single game session of a game. As a simple example, the game may be gender based, with the female team winning if more women join the game session than men in a given period of time, or visa-versa. In this embodiment, all women that join will be on the same team, and all men that join will be on the same team.

In an alternative of the geometric model, while all players participate in a single game session of a game, each pair of players (a user and their invitee) may participate in a sub-game, thus creating a large number of sub-games in the overall game session. In this model, a player who has both been invited to a game session and who has in turn invited another player to the game session may participate in two distinct sub-games; one with his inviter and one with his invitee. This is explained in greater detail below.

As opposed to a geometric fan-out, a game may alternatively fan-out linearly. In this example, the game may be passed from player to player who each in turn interact with the game. Examples of a geometric and linear fan-out are described in greater detail below with reference to FIGS. 4-6.

Figure 4:
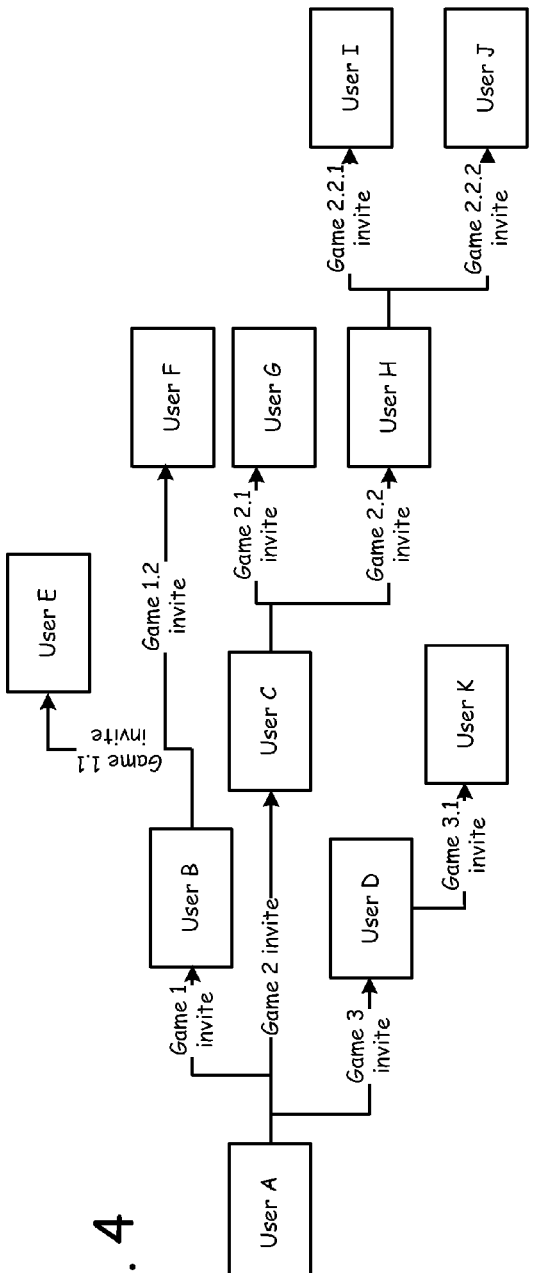
FIG. 4 is a logical representation of a peer-to-peer network generated according to an embodiment of the present system.

FIG. 4 shows a logical representation of a viral invite system including a geometric fan-out. The network shown in FIG. 4 may be a peer-to-peer network, however each user in the network may also communicate with console service 302 as indicated in FIG. 3 as explained below. In the example of FIG. 4, while playing a game, user A invites user B, user C and user D. Each of these invites may constitute a different sub-game of the same game session. Thus, user A may then have three distinct sub-games going on with users B, C and D, respectively.

User B may then for example invite users E and F. At this point, user B is involved in three sub-games, one each with users A, E and F. In order to identify where respective players are in a chain of invites, a convention may be adopted where the highest level games are x, one level downstream from there may be referred to as x.x, one level downstream from there may be referred to as x.x.x, and so on, where "x" is any integer. Thus, the sub-games between A and B, C and D may be referred to as sub-games 1, 2 and 3, respectively. The sub-games between users B and E and users B and F may be referred to as sub-games 1.1 and 1.2 respectively.

In the example of FIG. 4, user C similarly invites users G and H in game sessions 2.1 and 2.2 respectively. And, in the example of FIG. 4, user H invites users I and J in game sessions 2.2.1 and 2.2.2, respectively. It is understood that FIG. 4 is by way of an example only and that each user may invite more or less friends to play and that there may be many more subsets of games than are shown, both horizontally (one friend inviting many other friends) and/or vertically (downstream invites). As used herein, a chain of invites is a direct path from a first player to another downstream player through intermediate invites. Thus, in FIG. 4, players, A, C, H and J are in the same chain of invites.

As indicated above, each user in the peer-to-peer network may also have a connection to console service 302. In embodiments, an interaction and exchange of data between two players in a sub-game may take place peer-to-peer without involving the console service 302. However, in embodiments, data affecting other players and the overall game session as a whole is communicated from a user's console to the console service 302.

It is understood that the network 306 allowing communication between players, and players and console service 302, may operate according to a wide variety of configurations. In one embodiment, each player console may communicate directly with console service 302 as well as with peer consoles. In an alternative embodiment, only the highest level player consoles in the hierarchy of players for a given game session communicate with the console service 302. In this embodiment, downstream player consoles communicate their data to the console service 302 by "rolling up" their data. That is, a downstream player console passes its data to an upstream player console in a chain, which in turn rolls up data (including its data and downstream data) to an upstream player console, etc., until all data within the chain reaches the console service 302. Updated data may similarly propagate down the chains of the hierarchy in a similar (but reverse) manner. A further alternative embodiment may operate as a pure client/server model, with all data being exchanged directly between each player console and the console service 302.

Figure 5:
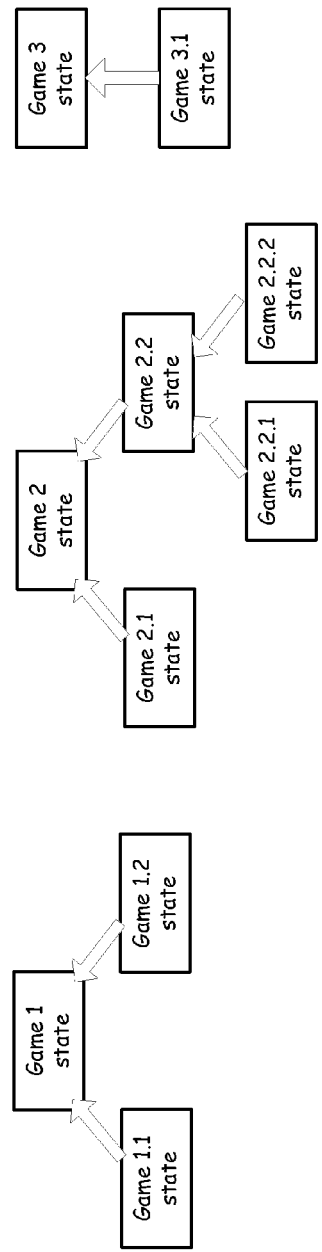
FIG. 5 is a logical representation of a hierarchical tree of the game states of the various sub-games in the peer-to-peer network of FIG. 4.

FIG. 5 shows a schematic representation of the game states for each game in the peer-to-peer network hierarchy. Each game state represents the data in a sub-game between a pair of players. FIG. 5 illustrates the game 1 state for the sub-game between users A and B of FIG. 4, game 1.1 state between users B and E of FIG. 4, and the game 1.2 state between users B and F of FIG. 4. FIG. 5 similarly shows the game states 2, 2.x and 2.x.x for the sub-games involving user C and users downstream of C, and the game states 3, 3.1 for the sub-games between users A and D, and users D and K.

At least some of the data associated with each game state (i.e., the data affecting other players and/or overall game session) is communicated to console service 302 for storage within game records 314. In embodiments having sub-games, an upstream player in a chain may get credit or rewarded in their sub-game for each downstream invite in a chain he or she initiated. A simple illustration of this point may be an example where the underlying game is a tug of war game where the winner is the user with the largest team. In the example of FIG. 4, user A had invited users B, C and D to a game of tug of war. In the game between users A and C, in the example of FIG. 4, user A's team includes users A, B, D, E, F and K. User C's team includes users C, G, H, I and J. Accordingly, user A wins six to five. Although user A invited user C, user A does not get credit for user C or C's downstream invitees in the game between user C, but user A would get credit for these players in his/her game between users B and D. User C also invited users G and H to play the game. Accordingly, as between users C and H, user C has users C and G on his team where user H has users H, I and J on his team. Thus, user H wins that game three to two. As can be seen, user H counted toward user C's tally in the game of tug of war between user A and user C, but user H was playing against user C, and did not count toward user C's tally in the game between users C and H. This is just one example from a wide variety of possible games, some of which are set forth below.

In the above example, the tally for each sub-game is maintained in the game state, which may be stored for a given sub-game both in the player consoles in that sub-game and/or within console service 302. The game states in the above example will vary up the chain as additional players are invited down the chain. Game states for a given sub-game may be updated accordingly by a number of different mechanisms. In one embodiment mentioned above, data rolls up the peer-to-peer hierarchy. Thus, as a new player joins a game, this data may roll upward to update all upstream players in that chain. The data may roll upward to the console service 302, which can then update game states in other chains. In an alternative embodiment, as a new player joins the game, the new player console may notify the console service 302 directly, which stores the data for the new game state and updates all game states in the various sub-games (ether directly, or by rolling down the hierarchical peer network).

Figure 6:
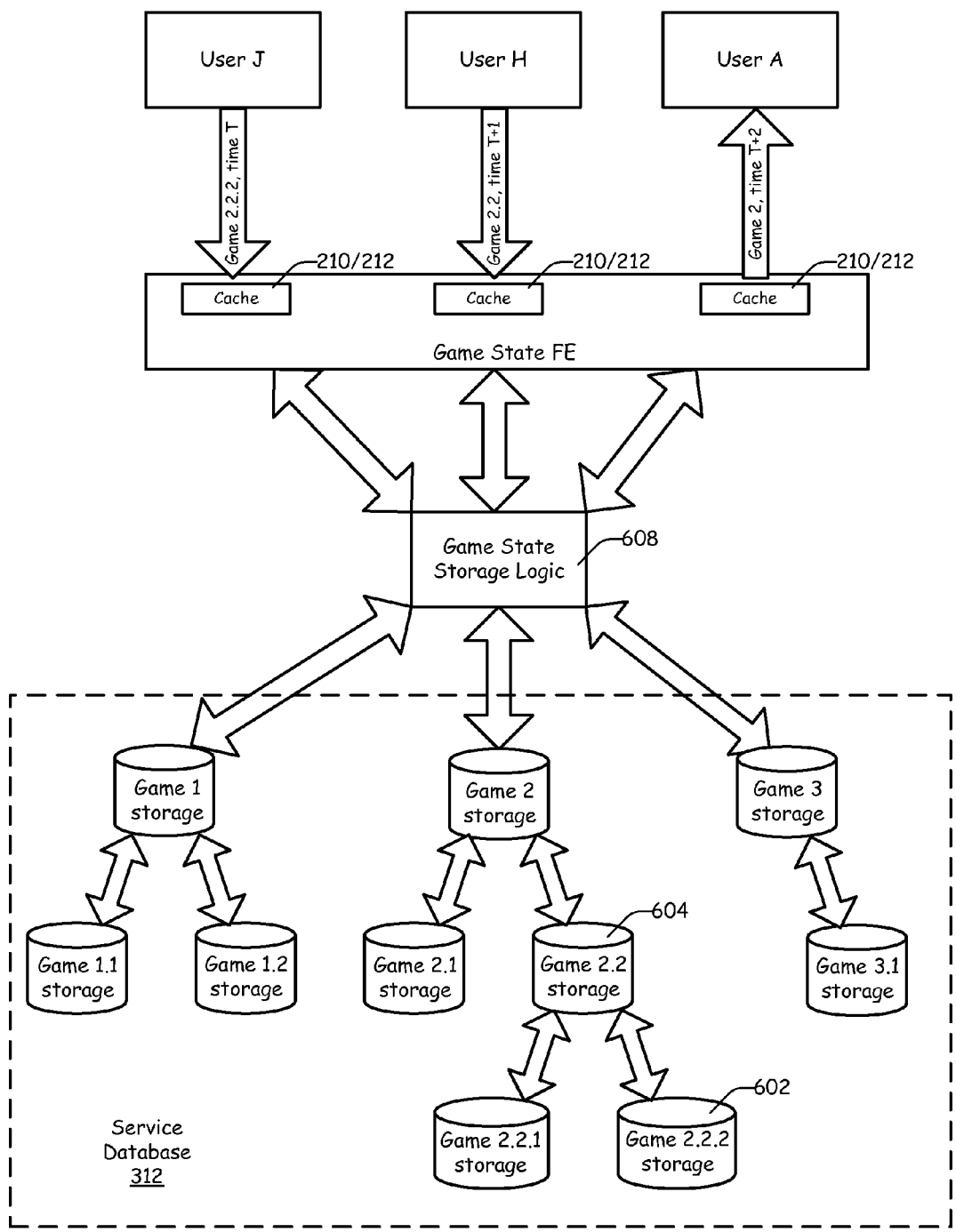
FIG. 6 is a block diagram of a portion of a service provider including a database partitioned in a hierarchical tree to match to the hierarchical tree of the game states in FIG. 5.

FIG. 6 shows a block diagram of a portion of console service 302, including service database 312. Service database 312 may be partitioned as described hereinafter to include game records 314 having the game states for all sub-games in a game session. As indicated above, many game interactions between a pair of users may be stored locally on their consoles without sending data to, or receiving data from, console service 302. However, periodically or when there is a change affecting players across the game, a player's console may send information to and/or receive information from console service 302.

In order to store the data received from each user in a particular game session in a coherent, easily manageable and scaleable fashion, service database 312 may be partitioned to include a separate game storage location for each game state in a particular game session. The partitioning of the database 312 shown in FIG. 6 matches each of the game states shown in FIG. 5. Thus, as players join and new game states are created, like partitions are created within database 312. The creation of new partitions as well as the read and write of data to the appropriate partition is controlled by game state storage logic 608. The storage logic 608 can identify which physical storage to use based on an identifier from a user console identifying the incoming game state.

For example, in FIGS. 4 and 5, when user J accepts user H's invitation to join, the console for user H and/or J may communicate with console service 302 to create game 2.2.2 state. Similarly, user H's console and user C's console may send updates to console service 302 to update game states 2.2 and 2, respectively, both of which updates reflecting the joining of user J. The information may be received in console service 302 in a game state front end, which may be a web or other server included as part of servers 304. Upon receipt of data for sub-game 2.2.2, that data may be stored in partition 602 for game 2.2.2 storage. At a time T+1, user H may similarly send the game state for sub-game 2.2 to the game state front end of console service 302. When data for sub-game 2.2 is received, that data is stored to partition 604 for game 2.2 storage. User C's console may similarly send an update for game 2 state, which is stored in game 2 storage.

In addition to or as an alternative to receiving game states from each console for respective storage partitions, storage logic 608 is able to reconstruct and update game storage partitions for upper level game states from downstream game states. For example, upon receiving updates to be stored in game storage 2.1 and 2.2, storage logic 608 is able to reconstruct the game state for game 2 storage by rolling up the data from game 2.1 storage and game 2.2 storage. Data may further be reconstructed by rolling down the hierarchical storage locations. Thus, data in a given storage location in partitioned database 312 may be received from a user console, from a higher level storage location, or from lower level storage locations.

The received and/or reconstructed data may also be sent from console service 302 to respective consoles. For example, upon receiving the updates from consoles J, H and C, service console 302 may send an update for game 2 at time T+2 to user A. As indicated above with respect to FIG. 2, the front end service 304 may include cache 210/212. As shown in FIG. 6, cache 210/212 may be used for receiving the game states from respective consoles, with data in cache 210/212 being refreshed to and from the respective game storage locations.

The above described system provides an advantage in that, as a game session gets larger and larger with viral invites, the database 312 may be scaled in a cohesive and organized manner to keep up with the game. Another aspect of this system is that a given game state can be persisted. That is, regardless of whether game play is synchronous or asynchronous, the game state for a given game may be maintained in storage, and available to players whether they remain online in real time, or have logged off for a period.

Data for linearly expanding games may be created, passed and stored in the same manner as is shown in FIGS. 4-6 for geometrically expanding games. However, with a linearly expanding game, instead of each new invite spawning a brand new sub-game, a single version of the game session may be passed around and updated by new invitees. A simple example of this is a traveling journal which is passed from user to user and records where in the world it has been as well as entries from each new user. Part of the game mechanic may be to forward the journal to as many friends as possible so that friends can then add entries and forward the journal on to their friends, and so on. In such an embodiment, service database 312 would not need to be partitioned as shown in FIG. 6. Such an embodiment may operate with a single database and instead of needing to pass on a game state in each invitation, the game identifier to a particular game session is all that is required to maintain and update that game session within service database 312. However, as in the geometric model, data entries can be partitioned in storage, and persist outside of the game so that the game may continue asynchronously for times when no one is actively playing.

Referring now to the invite mechanism within a given game with which a user interacts to invite friends or other gamers, invite platforms are known which allow fast, easy game invites during game play. Such invite systems including email and chat, are known in the art. One such system is disclosed in U.S. Pat. No. 7,240,093 to Danieli, entitled "Use of Online Messaging to Facilitate Selection of Participants in Game Play," which patent is assigned to the owner of the present application, and which patent is incorporated by reference herein in its entirety. Other invite mechanisms are contemplated.

The invite mechanism may be outside of the game, with the game configured to receive a message when invites are made. In an alternative embodiment, the invite mechanism may be provided for within the game itself. In the embodiments described above, invite data is used by a metric within a game in order to accomplish an objective of the game. In an alternative embodiment, invite metadata may be used to accomplish an objective outside of the game but related to the game. For example, such invite metadata may track inviting a given number of people across a given number of different games. This metadata may be stored and a user rewarded when the invite metadata indicates the user has attained a given objective.

In operation, while playing a game, a first user may invite a second user to join a session of a given game. In the event the invitee does not have that game, the invitee may download or otherwise obtain the game, for example, from Microsoft® Arcade or another gaming resource center. Once the invitee has obtained the game (or if the invitee already has the game), the invitee may launch the game and join the inviter in the game session.

In addition to the actual invitation to join, an invite may include a variety of other data. For example, the invite may include a GUID or other identifier uniquely identifying the particular game session. The invite may also include the game state uniquely placing the invite within the hierarchy of game invites. A game invite may further include a variety of rich descriptor data regarding the inviter as well as other upstream inviters within the chain. This information may include, for each user in the chain, the on-line identity of the user, geographic location of the user, the age of the user, the gender of the user, as well as a wide variety of other information. As discussed above, this information may be stored in the user records 310 in service database 312 of console service 302. Depending upon the game, some or all of these descriptor items may be used as a metric that affects the game. For example, in one embodiment, the objective of the game may be to invite as many people as possible from a given geographic area to join the game session. The "team" may be comprised of all players joining a game from a given country or other geographic location. The game is over when the given team grows to a predefined size.

As indicated above, in addition to the user who invited a given player, the player may also receive upstream information of others in the invite chain. This map of relationships, referred to as a traversal map, may be available for viewing along with an invite on an invitee's graphical user interface. Thus, an invitee is able to trace a path by which the invite was sent to him or her. A traversal map may include a wide variety of information about others in the chain of invites, depending on the particular game.

In addition to a user being able to invite one or more friends or other players, the present system further includes real time methods whereby a user can send a communication to all participants within a game to communicate and affect game play. This communication may include for example voting, cheering/booing, changing sides, etc. A given game may call for or provide an option over the user's graphical user interface allowing a user to select one of these communication options. Once selected, the communication may be sent from the user's console to console service 302, which in turn updates all other player consoles with the communication data.

Some examples of games which may make use of the viral invite mechanism as an object of the game have been described above. One simple example mentioned earlier is a game of tug of war between two players, where the victor is determined by the number of direct and downstream players accepting an invitation to join one team or the other. Traversal maps sent with each invitation may show how large a team is getting, how deep the invite levels were and where the players are from. In a slight variation, invites may be weighted, so that invited users who are geographically farther away are worth more than invited users who are geographically closer.

Another game mentioned above is a live journal that bounces from friend to friend, where the journal may be traced as it travels around the world. The game may last for a predefined period of time, such as for example six months. The game may be geometric in that new journals may branch out with each invite, or the journal may be linear in that one version of the journal is passed around to different users. In addition to carrying entries from each user, the journal may include a traversal map showing where the journal has been and information about each user who has made an entry.

In another game, one user from a group of users is randomly selected. His or her biography is posted on a message board accessible by all users. The race is then on to find a buddy chain that links a user to the selected user. The selected user may be identified by players communicating with others and creating buddy lists to connect to the selected user. This drives new social relationships, encourages buddy list expansion and increases time online. In a modification of this game, a user may be given information about someone else who is a number of degrees of separation from the user's buddy list. The user then needs to connect with others to identify the selected person.

Another game making use of the present system may be a global icebreaker game. All players start the game by submitting facts about themselves. The facts for a single player get published and other players need to search for the player who fits those facts, or for players who know who fits those facts. The game allows players to pick people from their friends list to ask if a fact applies to them. If not, the friend then has the option to help find the subject person by passing the question on to people on their friends list. In the end, a player can see the facts, the person who it is about, and the chain of friends that led to that person.

A further game is similar to the Taboo board game where a player gets a phrase that he or she tries to get other players to guess one word at a time without using the taboo phrase. The person who guesses correctly may then see the entire phrase, and then they try to get their friends (a different group) to guess the second word in the phrase. Once a player is done with their part, they can watch the rest of the conversation but not participate. If there is a taboo anywhere along the way, the game ends. A wide variety of other games designed to use the in-game viral invite mechanism of the present system are contemplated.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A computer implemented method of encouraging invites of users to join a game in a gaming system, comprising the step of:
   (a) running a software game on a processor of the gaming system, the software game having as an object of the game the invitation of players to join in the playing of the game, and for invited players to invite other additional players to join in the playing of the game; and
   (b) maintaining a record of the order in which players are invited to join the game, the record including an identifier uniquely identifying an invited player's position in the chain of invites relative to other invited players.

2. A computer implemented method as recited in claim 1, further comprising the step (c) of communicating invitations between players via a communications network.

3. A computer implemented method as recited in claim 1, further comprising the step (d) of storing information in a central database regarding each of the players joining a game and a status of the game.

4. A computer implemented method as recited in claim 3, further comprising the step (e) of communicating a traversal map to the invited players showing information from the central database about one or more players previously invited to join the game.

5. A computer implemented method as recited in claim 1, further comprising the step (f) of enabling real time interaction between all players invited to the game, said step (f) of enabling real time interaction including at least one of voting on an aspect of the game or game play, cheering or booing an aspect of the game or game play and the ability to change from a first side to a second side opposed to the first side in the game.

6. A computer implemented method as recited in claim 1, further comprising the step (g) of playing the game synchronously where invites are made and accepted in real time.

7. A computer implemented method as recited in claim 1, further comprising the step (h) of playing the game asynchronously where a game continues when one or more of the players who have accepted invitations to join a game are off-line.

8. A computer implemented method of encouraging invites of users to join a game in a gaming platform, comprising the steps of:
   (a) providing a gaming system allowing the invite of one or more additional players to join a game;
   (b) running a software game on a processor of the gaming system, the software game having as an object of the game the invitation of players to join in the playing of the game; and
   (c) communicating information with an invite including information about one or more players previously invited to join the game, the information including an identifier uniquely identifying an invited player's position in the chain of invites relative to other invited players.

9. A computer implemented method as recited in claim 8, the software game running in said step (b) having as a further object of the game for invited players to invite other additional players to join in the playing of the game.

10. A computer implemented method as recited in claim 8, said step (c) of communicating information with an invite further including an identifier uniquely identifying a game session of the game.

11. A computer implemented method as recited in claim 8, said step (c) of communicating information with an invite including information about one or more players previously invited to join the game comprising the step of including information about at least one of a country of origin, gender and age for each of the one or more players previously invited to join the game.

12. A computer implemented method as recited in claim 8, said step (c) of communicating information with an invite including information about one or more players previously invited to join the game comprising the step of communicating information in an invite to a potential player only about players in a chain of invites that led to the potential player.

13. A computer implemented method as recited in claim 8, further comprising the step (d) of communicating geometric invites to additional players via a peer-to-peer network.

14. A computer implemented method as recited in claim 13, further comprising the step (e) of storing and updating a status of the game via direct communication between one or more players and a central database.

15. A computer implemented method as recited in claim 14, wherein each accepted invite results in a sub-game of the overall game, the sub-game being between the inviting player and the player accepting the invitation, each sub-game being separate from each other sub-game.

16. A computer implemented method as recited in claim 15, further comprising the step (f) of partitioning the central database in a hierarchy matching a hierarchy of sub-games in the peer-to-peer network.

* * * * *